US012453970B2

(12) United States Patent
Eberhardt et al.

(10) Patent No.: US 12,453,970 B2
(45) Date of Patent: Oct. 28, 2025

(54) SAMPLE VESSEL HAVING A CAVITY FOR ACCOMMODATING A SAMPLE

(71) Applicant: Sartorius Automated Lab Solutions GmbH, Jena (DE)

(72) Inventors: Jens Eberhardt, Gera (DE); Constantin Nelep, Clamart (FR); Gerd Bornmann, Weimar (DE)

(73) Assignee: Sartorius Automated Lab Solutions GmbH, Jena (DE)

( * ) Notice: Subject to any disclaimer, the term of this patent is extended or adjusted under 35 U.S.C. 154(b) by 938 days.

(21) Appl. No.: 17/369,590

(22) Filed: Jul. 7, 2021

(65) Prior Publication Data

US 2021/0331157 A1 Oct. 28, 2021

Related U.S. Application Data

(63) Continuation of application No. PCT/EP2020/050149, filed on Jan. 6, 2020.

(30) Foreign Application Priority Data

Jan. 7, 2019 (DE) ..................... 10 2019 100 256.7

(51) Int. Cl.
*B01L 3/00* (2006.01)
*B01L 3/02* (2006.01)

(52) U.S. Cl.
CPC ........... *B01L 3/5085* (2013.01); *B01L 3/0293* (2013.01); *B01L 2200/026* (2013.01); *B01L 2200/0642* (2013.01); *B01L 2300/0893* (2013.01); *B01L 2300/0896* (2013.01); *B01L 2400/0487* (2013.01); *B01L 2400/049* (2013.01)

(58) Field of Classification Search
CPC ................ B01L 3/5085; B01L 3/0293; B01L 2200/026; B01L 2200/0642; B01L 2300/0893; B01L 2300/0896; B01L 2400/0487; B01L 2400/049
See application file for complete search history.

(56) References Cited

U.S. PATENT DOCUMENTS

| | | | |
|---|---|---|---|
| 10,870,111 | B2 | 12/2020 | Ramsey et al. |
| 2017/0022467 | A1 | 1/2017 | Orynbayeva et al. |

(Continued)

FOREIGN PATENT DOCUMENTS

| | | | |
|---|---|---|---|
| DE | 30 29 718 | A1 | 2/1982 |
| DE | 10 2017 113 454 | A1 | 12/2018 |

(Continued)

OTHER PUBLICATIONS

International Search Report dated Apr. 17, 2020 of international application PCT/EP2020/050149 on which this application is based.

(Continued)

*Primary Examiner* — Kathryn Elizabeth Limbaugh
(74) *Attorney, Agent, or Firm* — Walter Ottesen, P.A.

(57) ABSTRACT

The disclosure relates to a sample vessel including a cavity for accommodating a sample, a first opening for introducing the sample and a bottom opposite the first opening as well as at least one additional opening of the cavity. According to the disclosure, the at least one additional opening opens toward the outside of the cavity on the side of the cavity opposing the bottom. The disclosure further relates to a carrier plate, an evacuation needle, as well as a method for evacuating a sample.

8 Claims, 8 Drawing Sheets

(56) References Cited

U.S. PATENT DOCUMENTS

| | | | |
|---|---|---|---|
| 2019/0054470 | A1 | 2/2019 | Ramsey et al. |
| 2021/0069711 | A1 | 3/2021 | Ramsey et al. |

FOREIGN PATENT DOCUMENTS

| | | | |
|---|---|---|---|
| JP | 2011-511933 | A | 4/2011 |
| JP | 2018-531369 | A | 10/2018 |
| WO | 2017/065854 | A2 | 4/2017 |

OTHER PUBLICATIONS

English translation and Written Opinion of the International Searching Authority dated Apr. 17, 2020 of international application PCT/EP2020/050149 on which this application is based.

English translation and International Preliminary Report on Patentability dated Jun. 16, 2021 of international application PCT/EP2020/050149 on which this application is based.

English translation of Japanese Office action dated Sep. 27, 2023 of corresponding Japanese application 2021-539098.

Zhang, Y. et al, "Single Molecule DNA Resensing Using a Two-Pore Device", Small, 14, 1801890, 2018, Wiley-VCH Verlag GmbH & Co., KGaA, Weinheim, pp. 1 to 11.

SAMPLE VESSEL HAVING A CAVITY FOR ACCOMMODATING A SAMPLE

CROSS REFERENCE TO RELATED APPLICATIONS

This application is a continuation application of international patent application PCT/EP2020/050149, filed Jan. 6, 2020 designating the United States and claiming priority from German application 10 2019 100 256.7, filed Jan. 7, 2019, and the entire content of both applications is incorporated herein by reference.

TECHNICAL FIELD

The disclosure relates to a sample vessel, particularly a so-called nanowell, a carrier plate including sample vessels according to the disclosure, and an evacuation needle. The disclosure further relates to a method for evacuating a sample from a sample vessel.

BACKGROUND

Sample vessels for use in, for example, biochemistry, cellular biology, or genetics having cavities of 0.4 ml and more are, for example, known from DE 30 297 18 A1. The sample formed by a liquid medium is sucked in through an additional channel in the area of the bottom of the cavity and accommodated in a reservoir of the cavity. The extraction of the stored sample from the reservoir takes place via the first opening.

Nanowells are understood to be sample vessels which, due to their volumetric capacity and/or their dimensions, can only hold one or just a few biological cells or objects of comparable size which will hereinafter collectively be referred to as samples. A number of nanowells may be formed as a nanowell array on a holder (chip). Such nanowell arrays are commercially available.

As an example, the unpublished DE 10 2017 113 454 is made reference to in which such nanowells—also referred to as cavities—are described. The samples are introduced into and transported out of the cavity again through a first opening.

Nanowells are, in particular, used to, ideally, accommodate only one object, for example a cell, per cavity, respectively, and to render the selective extraction and/or analysis possible when required. For extracting individual cells, for example, hollow needles such as capillaries of glass or cannulas are used as tools.

In the process, the object to be extracted from the respective cavity is sucked into the hollow needle via a fluid flow (aspiration). In the process, a direct contact with the tool is to be avoided to protect the object from damage. Therefore, the intake opening of the tool has to be larger than the diameter of the object to be sucked in. In case of extremely small dimensions of the nanowell and the requirement that the intake opening of the tool cannot be scaled down as desired for the aforementioned reasons flow-related difficulties arise. These reside, for example, in the disadvantageous generation of a substantial negative pressure in the cavity without the creation of a corresponding intake flow or aspiration flow. It is also possible that, even though an aspiration flow is caused, it does not spread throughout the cavity, and the object to be sucked in is not or not reliably transported out of the cavity into the tool.

SUMMARY

It is an object of the disclosure to provide a possibility of extracting objects from cavities of sample vessels which is improved as compared to prior art.

With regard to the configuration of a sample vessel, the above object can, for example, be solved by a sample vessel including: a sample vessel body defining a cavity for accommodating a sample; the sample vessel body further defining a first opening for introducing the sample; the sample vessel body having a bottom opposite the first opening; the sample vessel body further defining at least one additional opening of the cavity; and, wherein the at least one additional opening opens to outside of the cavity on a side of the cavity opposite the bottom.

In terms of a method according to the disclosure, the aforementioned object can, for example, be achieved via a method for evacuating a sample from a cavity of a sample vessel. The method includes: directing a first flow of a medium into the cavity and directing a second flow of the medium out of the cavity, wherein the flows are generated by using at least two channels separately opening into the cavity; generating the first flow and the second flow by causing pressure differences in the at least two channels; and, adjusting at least one of the first flow and the second flow and a transporting capacity thereof so as to cause the sample to be flushed out of the cavity.

In addition, a carrier plate and an evacuation needle are proposed.

The sample vessel includes a cavity for accommodating a sample. A sample is, for example, a biological cell, a group of cells and/or objects of a comparable size.

The cavity has a first opening for introducing the sample into the cavity. The sample is also removed from the cavity through the first opening. Opposite the first opening, there is a bottom of the cavity.

According to the disclosure, at least one additional opening of the cavity is provided which opens to the outside of the cavity on the side of the cavity opposite the bottom. The mouth of the additional opening to the outside of the cavity may be substantially located in the plane of the first opening here. It may, in further embodiments, protrude beyond it or open between half the depth of the cavity and the plane of the first opening.

An aspect of the invention is to support the supply of a medium into the cavity via the additional opening to achieve the formation of an aspiration flow even when the tool, that is, a hollow needle used to suck in the sample, and the first opening of the cavity have the same or approximately the same dimensions.

The additional opening enables an inflow of the medium from the surroundings of the sample vessel into the cavity and the formation of an aspiration flow. Particularly in the field of cellular biology, immunology, but also in genetics, for example, cells are isolated and deposited in cavities and overlaid with a nutrient medium. Usually, arrays including a plurality of cavities are used so that also adjacent cavities and samples are overlaid with the same nutrient medium. For selectively extracting samples from the individual cavities, the formation of the aspiration flow has to be limited, to the greatest extent possible, to the respectively selected cavity. The additional opening advantageously renders the use of a hollow needle having a suction opening with the same dimensions as those of the first opening possible while, at the same time, a sufficiently large aspiration flow is formed. Incidentally, the flows in the overlaying medium are locally limited so that the risk of a disadvantageous influence on adjacent samples is low.

The tool used to suck in the sample may, in case of a sample vessel according to the disclosure, advantageously be advanced toward the first opening to a few micrometers or even abut on the edge of the first opening.

In an embodiment of the sample vessel, a channel opening into the cavity may be connected to the at least one additional opening. Advantageously, the mouth of the channel in the cavity is formed in the vicinity of the bottom in order to also capture samples located close to the bottom via an aspiration flow and to transport them in the direction toward the first opening.

A channel may, at least over part of its length, be separated from the cavity by a wall. In further embodiments, a channel may also be formed by ribs or ridges in the wall of the cavity which substantially extend from the additional opening in the direction toward the bottom.

The additional opening may substantially lie on a plane with the first opening and be connected to the first opening, for example directly transition into it. This embodiment may be manufactured in a technologically precise and cost-effective manner.

A sample vessel according to the disclosure is particularly advantageous in case of small cavities in which the first opening has an inside diameter of no more than 0.5 mm, particularly of no more than 0.3 mm.

Advantageously, the additional opening and/or a channel connected to it have smaller dimensions than the first opening to avoid an unintended flushing-out of the sample through the additional opening. The dimensions of the first opening and/or the additional opening may be selected depending on the sample.

A plurality of sample vessels may be formed on a carrier plate. An array of sample vessels or cavities formed in this way renders the swift or simultaneous analysis and/or effective handling of a larger number of samples possible.

An aspect of the invention may also be realized by a correspondingly modified tool. The tool referred to as evacuation needle here serves to selectively extract a sample from a cavity of a sample vessel. The evacuation needle has a main channel, wherein, in addition, at least one secondary channel is provided, the main channel and the secondary channel separately opening in the area of the tip of the evacuation needle. The secondary channel is advantageously connected to the surroundings of the evacuation needle here. When, for example, an aspiration flow is generated in a cavity via the main channel, the medium from the surroundings may flow in through the secondary channel and advantageously support or even only enable the formation and stability of the aspiration flow. Advantageously, commercially available sample vessels or arrays may be used.

This object can, for example, further be solved by a method for evacuating a sample from a cavity of a sample vessel. In the process, a flow of a medium directed into the cavity and a flow of a medium directed out of the cavity is generated by using at least two channels separately opening into the cavity. The flow is generated by causing pressure differences in the channels. For example, a negative pressure or a positive pressure may be applied to one of the channels. To another one of the channels, correspondingly, a positive pressure or a negative pressure is applied. In the process, the positive pressure may be actively applied, for example via a pumping device. It is equivalent when the positive pressure is produced as a result of a suction effect of the applied negative pressure and leads to a flow of a medium in the direction of the negative pressure. A flow produced in this way as well as its transporting capacity in the cavity are adjusted so that the sample is flushed out of the cavity.

BRIEF DESCRIPTION OF THE DRAWINGS

The invention will now be described with reference to the drawings wherein.

DESCRIPTION OF THE PREFERRED EMBODIMENTS

Figure 1:
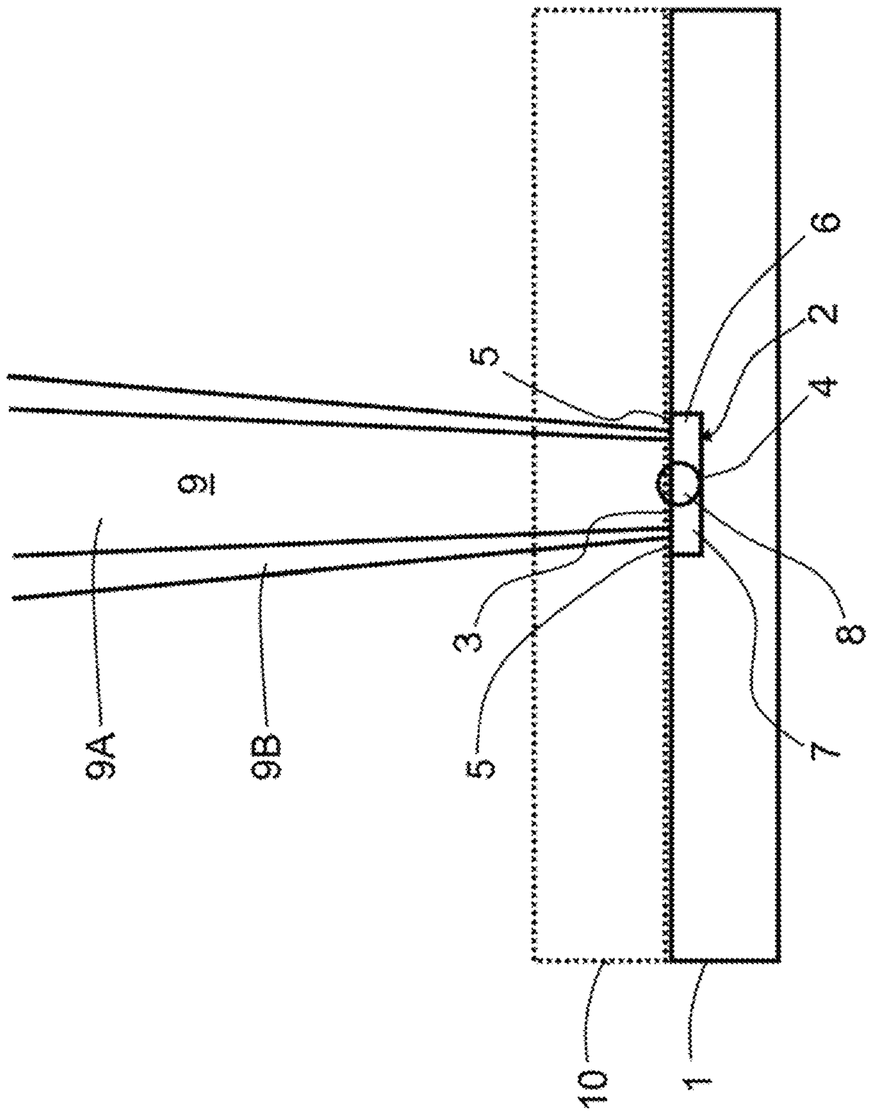
FIG. 1 shows a schematic illustration of an embodiment of a sample vessel according to the disclosure as well as of the method according to the disclosure.

In FIG. 1, a sample vessel 1 according to the disclosure is illustrated in a lateral cross-sectional view. A cavity 2 of the sample vessel 1 includes a first opening 3 and an opposed bottom 4. Sideways of the first opening 3, two additional openings 5 are provided. These are respectively connected to a channel 6 separated from the cavity 2 by a wall 7 and opening into the cavity 2 in the area of the bottom 4. In the cavity 2, a sample 8, for example a biological cell, is located on the bottom 4.

On the first opening 3, a capillary 9 is positioned as a tool in which the sample 8 is to be received. In the capillary 9, a negative pressure also communicating to the cavity 2 is generated. As a result of the negative pressure in the cavity 2, a medium 10 overlaid on the sample vessel 1 is sucked into the cavity 2 through the additional opening 5 and the channel 6. As an outcome, an aspiration flow (illustrated by arrows) directed from the bottom 4 toward the first opening 3 and the capillary 9 is generated in the cavity 2. Owing to its transporting capacity, the sample 8 is transported out of the cavity 2 into the capillary 9. FIG. 1 shows an evacuation needle embodied as a capillary 9. FIG. 1 further shows the evacuation needle having a first channel 9A and a secondary channel 9B. Channel 9B and channel 6 can both be secondary/additional channels for improving the aspiration flow.

Figure 2:
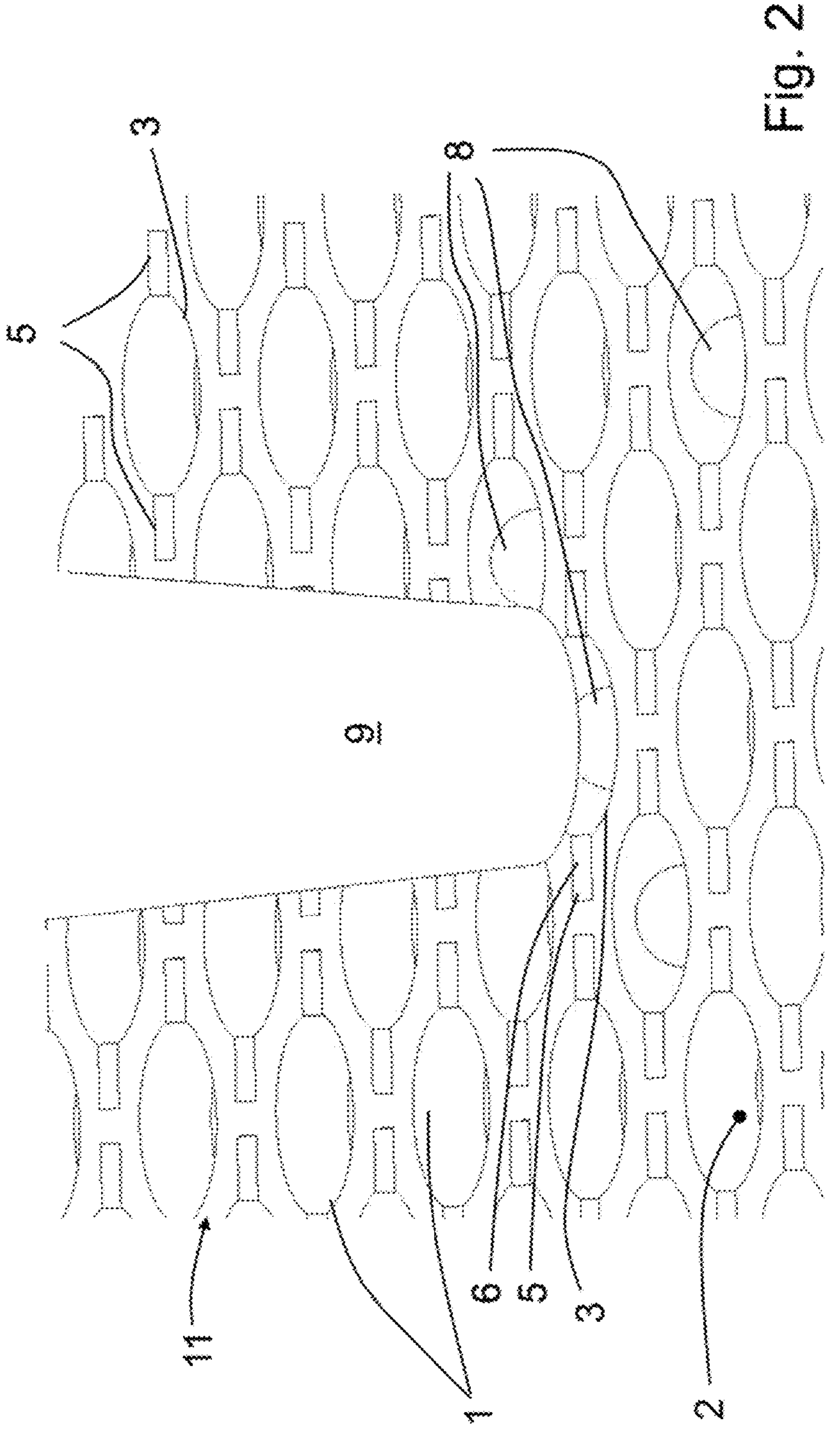
FIG. 2 shows a schematic illustration of an array of sample vessels according to a first embodiment of a sample vessel according to the disclosure and a capillary.

FIG. 2 shows a capillary 9 allocated to a sample vessel 1 in an array 11 of sample vessels 1. The first opening 3 has a circular shape. On two opposing edges of the first opening 3, an additional opening 5 is formed, respectively. These are located on the same plane as the first opening 3 and are connected to it. The capillary 9 substantially covers the first opening 3 while part of the extension of the additional openings 5 protrudes beyond the capillary 9. A sample 8 present in the cavity 2 may be transported from the cavity 2 into the capillary 9 using the method according to the disclosure. The embodiment shown in FIG. 2 also includes the channel 6 which connects the additional opening 5 with the first opening 3.

Figure 3:
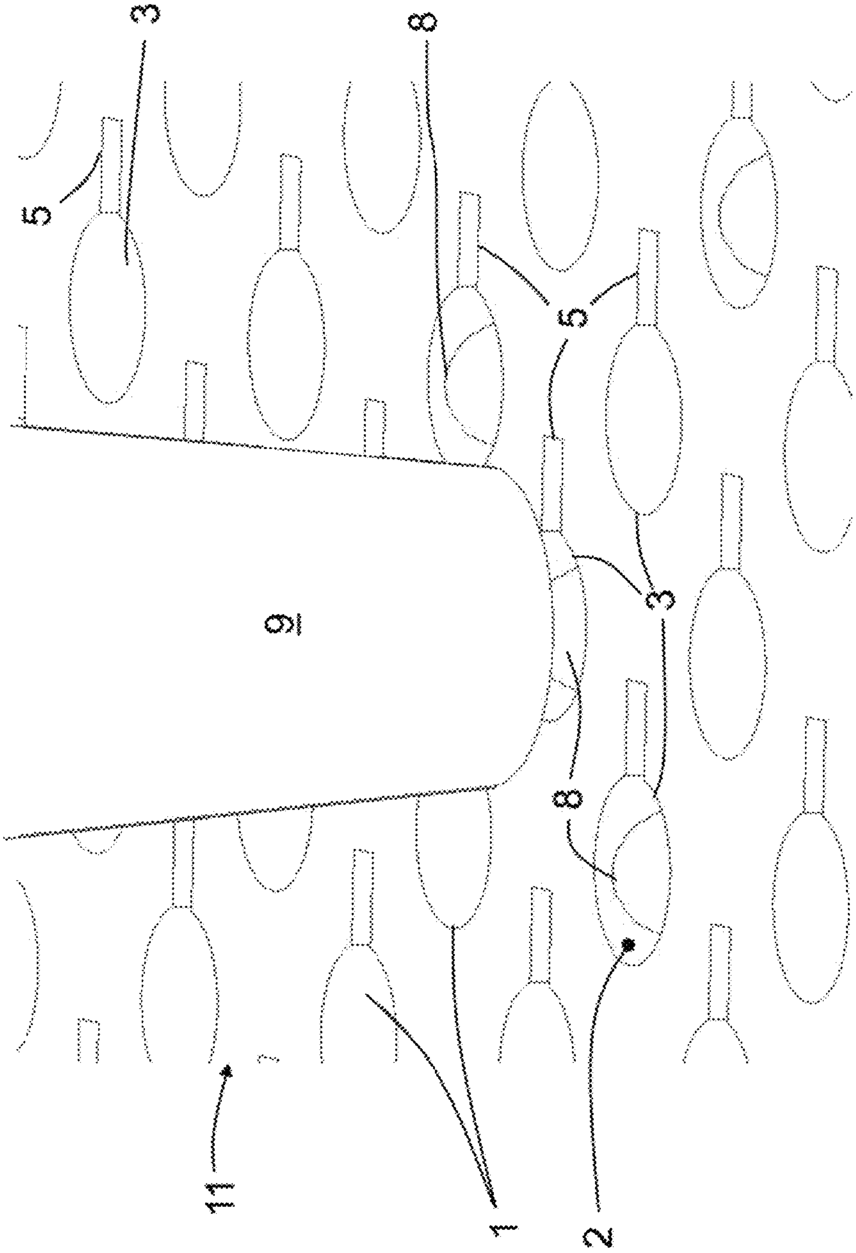
FIG. 3 shows a schematic illustration of an array of sample vessels according to a second embodiment of a sample vessel according to the disclosure and a capillary.

Another potential shape and arrangement of the additional opening 5 are shown in FIG. 3. The circular first opening 3 is connected to an additional opening 5 formed as described in connection with FIG. 1.

Figure 4:
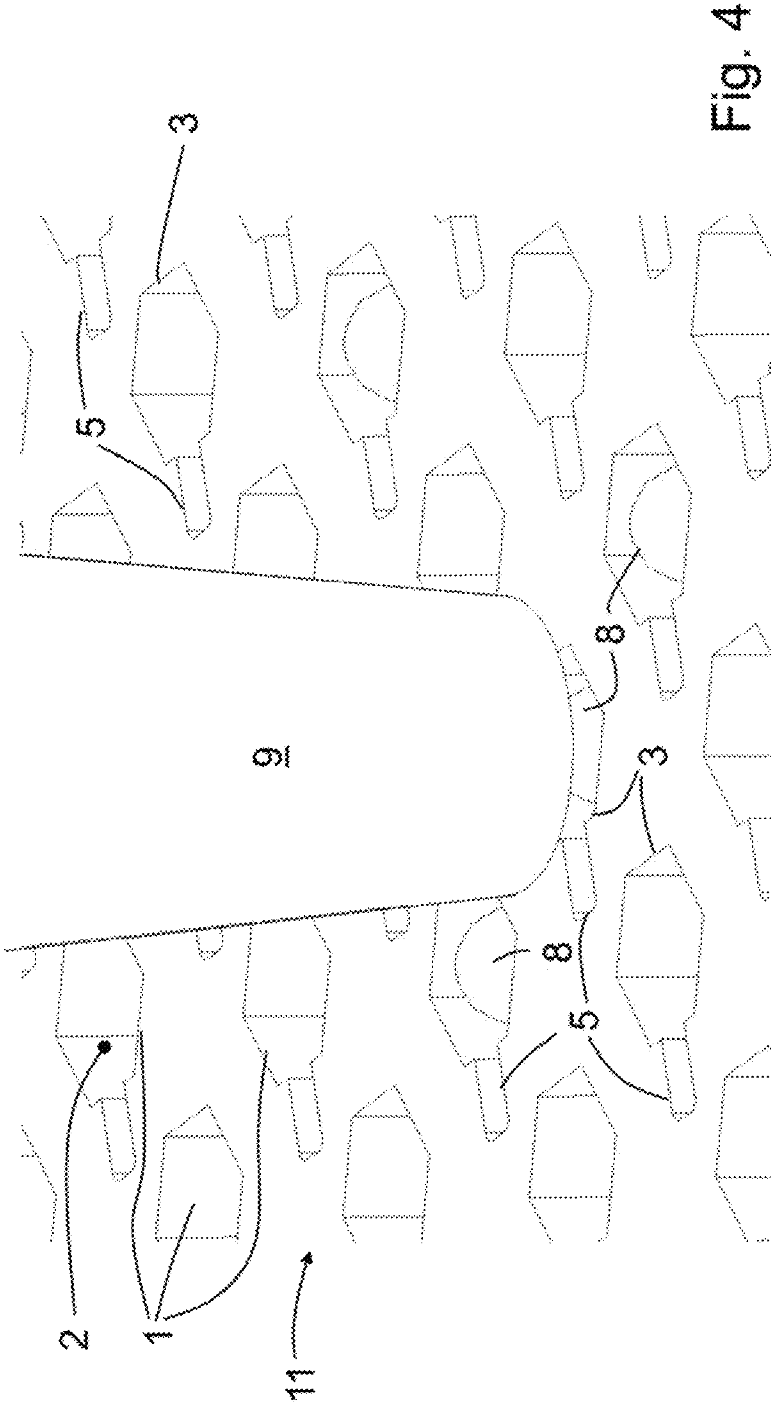
FIG. 4 shows a schematic illustration of an array of sample vessels according to a third embodiment of a sample vessel according to the disclosure and a capillary.

In FIG. 4, an array 11 including sample vessels 1 having a hexagonal first opening 3 is shown. The additional opening 5 is formed as a rectangular recess and connected to the first opening 3.

Figure 7:
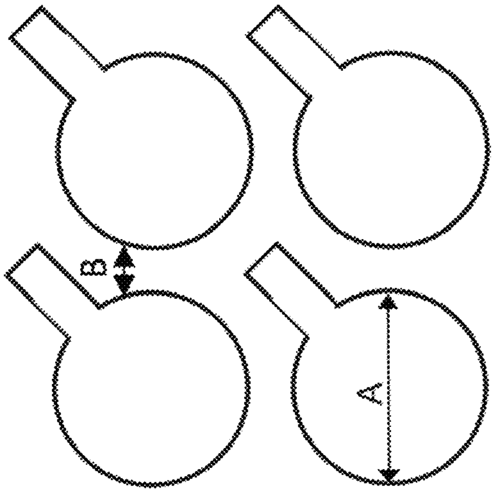
FIG. 7 shows a schematic illustration of another embodiment of the first opening and the additional opening of a sample vessel according to the disclosure.
Figure 6:
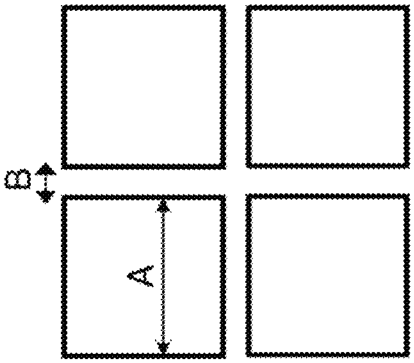
FIG. 6 shows a schematic illustration of another embodiment of the first opening and the additional opening of a sample vessel according to the disclosure.
Figure 5:
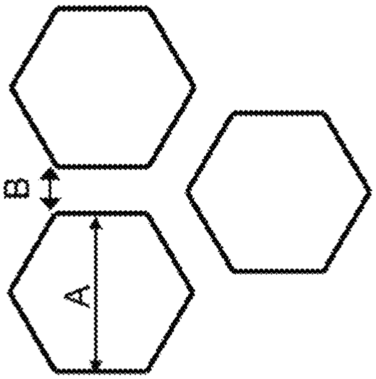
FIG. 5 shows a schematic illustration of an embodiment of the first opening and the additional opening of a sample vessel according to the disclosure.

Examples of first openings 3 and additional openings 5 are shown in FIGS. 5 to 7. The first openings 3 may be formed as hexagons having an inner diameter A and a mutual distance B or pitch B. When a capillary 9 having a circular opening with an outer diameter equal to the inner diameter A is brought into abutment with these first openings 3 the sections of the corners of the first openings 3 not covered by the capillary 9 which are further apart from each other than the inner diameter A may function as additional openings 5.

The same applies to the quadratic first openings 3 shown in FIG. 6 having the inner diameter A and a distance B.

The first openings 3 shown in FIG. 7 are circular and have, at an angle of, for example, 45°, an additional opening 5, respectively.

The first openings 3 shown in FIGS. 5 to 7 have, for example, inner diameters of 15, 30, 45, or 200 μm. The distance B is, for example, 10 μm.

Figure 8:
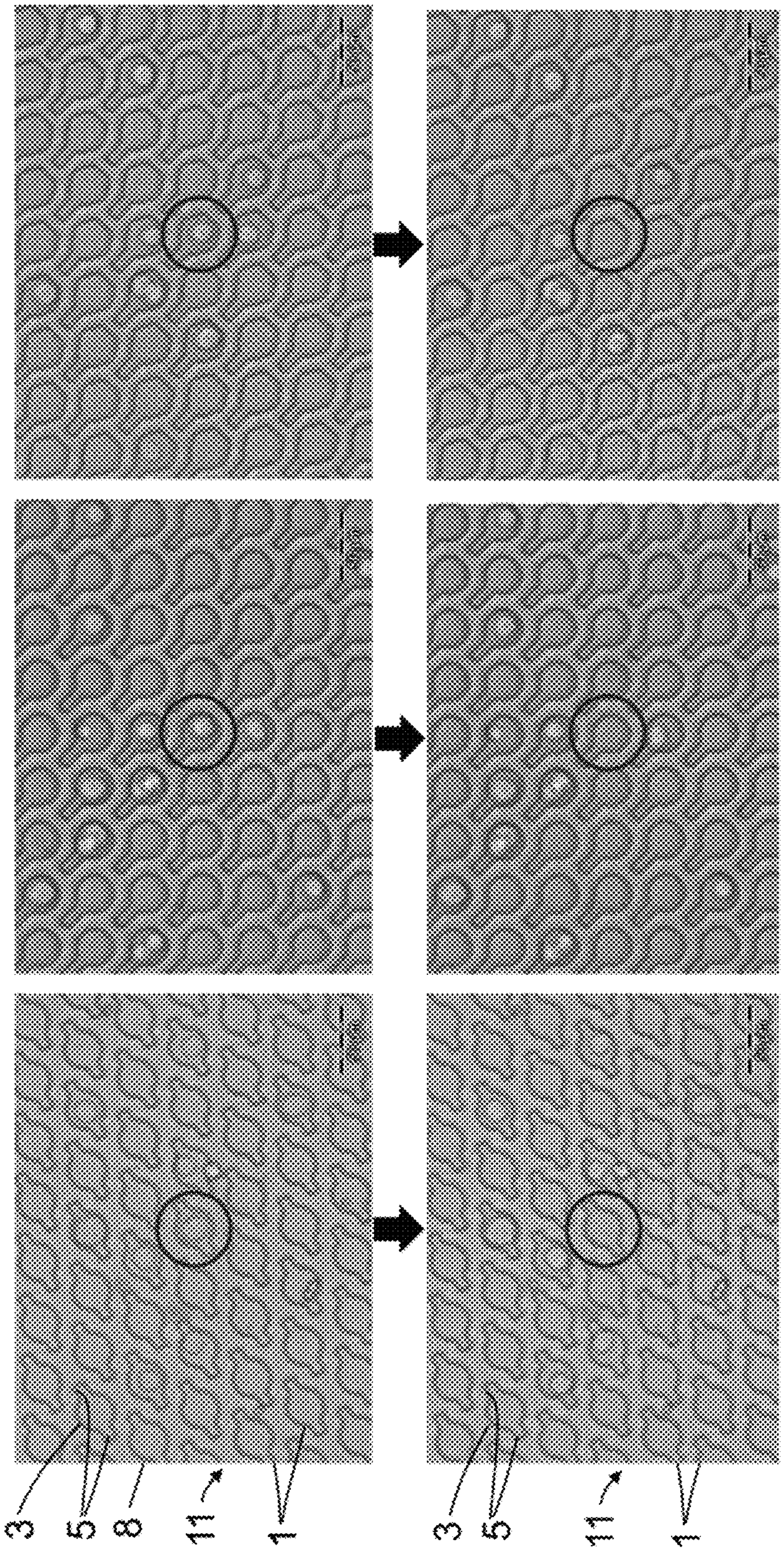
FIG. 8 shows the selective extraction of respectively one sample from sample vessels according to the disclosure, a selected sample vessel before and after the extraction being marked per column (original images)
Figure 9:
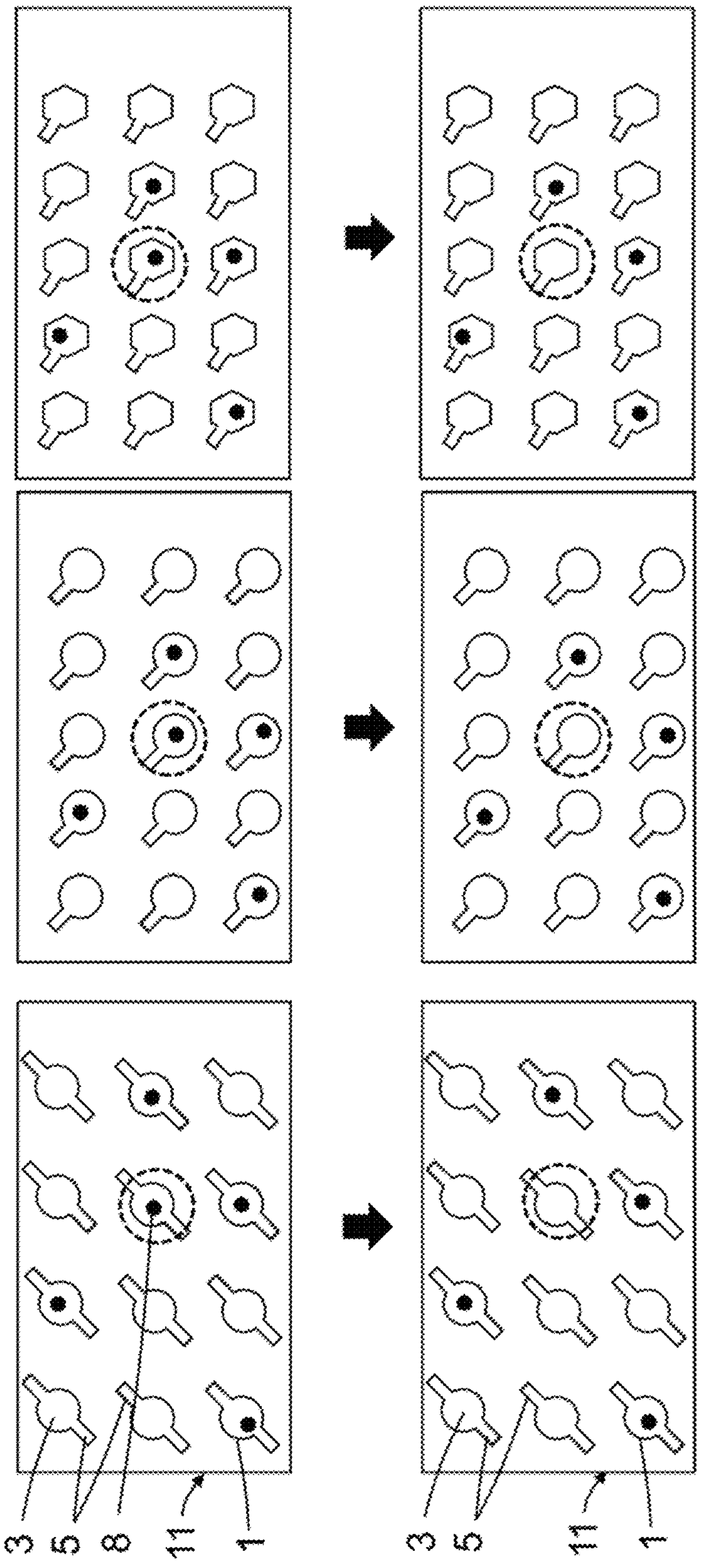
FIG. 9 shows a schematic illustration of the selective extraction of respectively one sample from sample vessels according to the disclosure, a selected sample vessel before and after the extraction being marked per column; and, FIG. 10 shows a schematic illustration of an embodiment of a carrier plate including two arrays of sample vessels according to the disclosure.

The functionality of the sample vessels 1 according to the disclosure is evidenced by way of example in FIG. 8 and FIG. 9. For three differently implemented first openings 3 and additional openings 5, an array 11 of sample vessels 1 is shown, respectively. Respectively one sample vessel 1 containing a sample 8 is selected and highlighted by a mark (circle). In the upper row, the states of the sample vessels 1 before the extraction of the sample 8 are shown, respectively, and in the lower row, the states of the sample vessels 1 after the extraction via the method according to the disclosure are shown, respectively. In all cases, the selected sample 8 was removed from the cavity 2 while the samples 8 in the adjacent cavities 2 remained unaffected.

Figure 10:
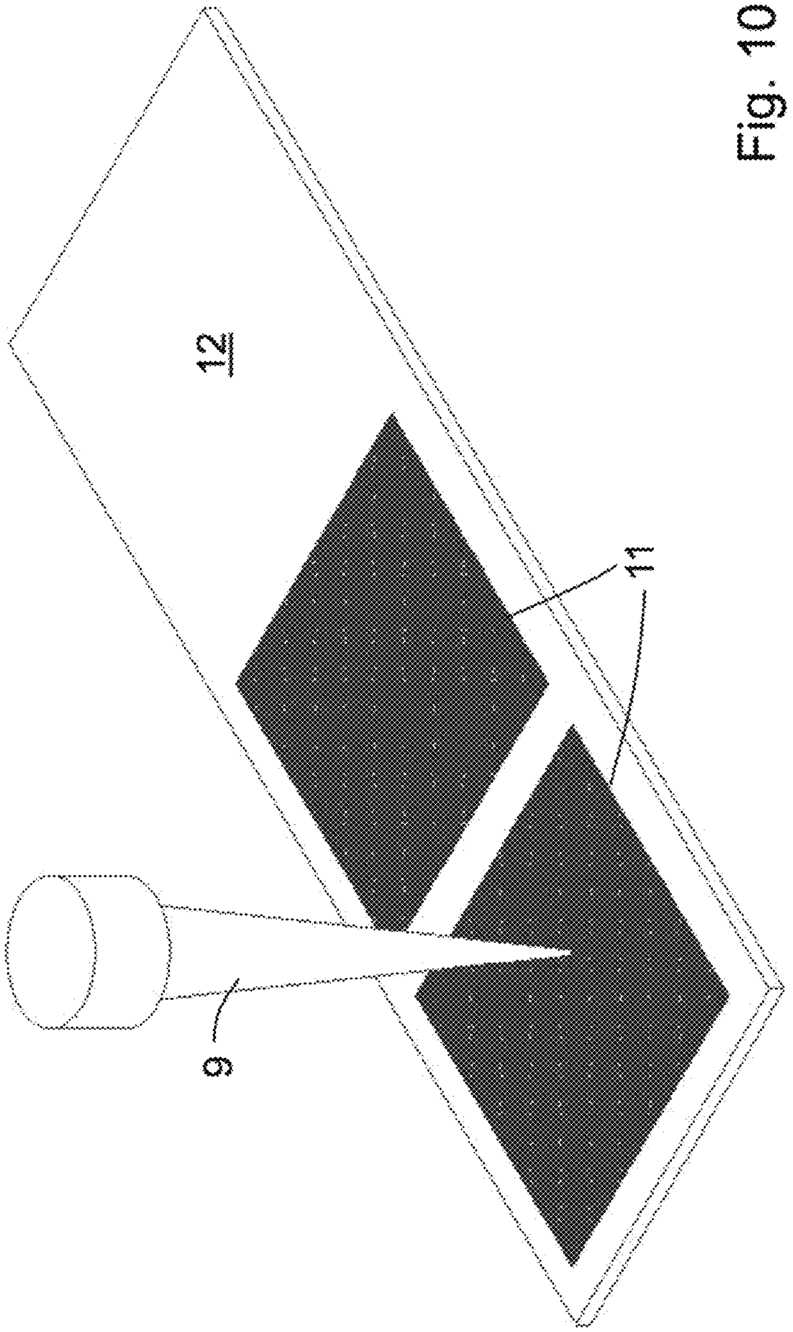

For rendering an effective analysis of the plurality of sample vessels 1 possible, arrays 11 may be arranged on a carrier plate 12. FIG. 10 shows a carrier plate 12 including two arrays 11 and a capillary 9.

It is understood that the foregoing description is that of the preferred embodiments of the invention and that various changes and modifications may be made thereto without departing from the spirit and scope of the invention as defined in the appended claims.

REFERENCE NUMERALS

1 Sample vessel
2 Cavity
3 First opening
4 Bottom
5 Additional opening
6 Channel
7 Wall
8 Sample
9 Capillary
10 Medium
11 Array
12 Carrier plate
A Inner diameter
B Distance (pitch)

What is claimed is:

1. A sample vessel comprising:

a sample vessel body defining a central cavity, wherein said cavity is arranged to receive and immobilize a single cell and to this end includes:

a first opening for introducing said single cell, whereas said opening is of a round or a hexagonal cross-section that in size matches said single cell;

said sample vessel body having a bottom opposite said first opening;

said sample vessel body further defining two additional openings on two opposing edges of said first opening of the cavity;

wherein said two additional openings each open to outside of said cavity on a side of the cavity opposite said bottom; and, wherein said two additional openings are smaller in diameter than said single cell.

2. The sample vessel of claim 1, wherein said sample vessel body defines a channel connected to each said two additional openings and said channel opens into said cavity.

3. The sample vessel of claim 1, wherein said two additional openings lie substantially in a plane with said first opening and are connected to said first opening.

4. The sample vessel of claim 1, wherein said first opening has an inner diameter (A) of no more than 0.5 millimeters.

5. The sample vessel of claim 1, wherein said first opening has an inner diameter (A) of no more than 0.3 millimeters.

6. A carrier plate comprising a plurality of sample vessels according to claim 1.

7. A method for evacuating a single cell from a cavity of a sample vessel, the method comprising:

directing a first flow of a medium into the cavity and directing a second flow of the medium out of the cavity, wherein the flows are generated by using at least two channels separately opening into the cavity;

generating the first flow and the second flow by causing pressure differences in the at least two channels; and, adjusting at least one of the first flow and the second flow and a transporting capacity thereof so as to cause said single cell to be flushed out of the cavity.

8. A method for evacuating a single cell sample from a cavity of each sample vessel of a plurality of sample vessels with a carrier plate including the plurality of sample vessels, each of the sample vessels including: a sample vessel body defining a central cavity, wherein the cavity is arranged to receive and immobilize a single cell and to this end includes: a first opening for introducing the single cell, whereas the opening is of a round or a hexagonal cross-section that in size matches the single cell; the sample vessel body having a bottom opposite the first opening; the sample vessel body further defining two additional openings on two opposing edges of the first opening of the cavity; wherein the two additional openings each open to outside of the cavity on a side of the cavity opposite the bottom; and, wherein the two additional openings are smaller in diameter than the single cell; the method comprising the steps of:

providing an evacuation needle for selectively extracting a single cell from the cavity of each sample vessel of the carrier plate, the evacuation needle including: a needle body defining a tip and a main channel, wherein the needle body defines a secondary channel that is additionally provided;

opening the main channel and the secondary channel separately in an area of the tip of the evacuation needle; and, wherein a first channel is in alignment with a first opening of the cavity of the sample vessel when a secondary channel is aligned with a second opening of the cavity of the sample vessel.

* * * * *